United States Patent

Nagao et al.

[11] Patent Number: 6,162,320
[45] Date of Patent: Dec. 19, 2000

[54] SEALING OF POLYOLEFIN-BASED RESIN AND SEALED ARTICLE OF THE RESIN

[75] Inventors: Tomohiro Nagao, Sodegaura; Shunichi Nagashima; Kenichi Fujiwara, both of Tokyo, all of Japan

[73] Assignee: Idemitsu Petrochemical Co., Ltd., Tokyo, Japan

[21] Appl. No.: 09/265,595

[22] Filed: Mar. 10, 1999

[30] Foreign Application Priority Data

Mar. 25, 1998 [JP] Japan .................................. 10-077156

[51] Int. Cl.$^7$ .............................. B32B 31/04; B32B 31/20
[52] U.S. Cl. .................................... 156/274.4; 156/275.1; 156/290; 156/308.4
[58] Field of Search ............................. 156/274.4, 275.1, 156/290, 308.4, 380.6, 580

[56] References Cited

U.S. PATENT DOCUMENTS

| 4,378,396 | 3/1983 | Urai et al. | 428/198 |
| 4,589,568 | 5/1986 | Ito et al. | 220/359 |

*Primary Examiner*—Sam Chuan Yao
*Attorney, Agent, or Firm*—Oblon, Spivak, McClelland, Maier & Neustadt, P.C.

[57] ABSTRACT

A method is provided for laminating polyolefin resins, which includes placing a plurality of polyolefin resin films or sheets one upon another and sealing the adjacent surfaces of the films or sheets by high-frequency dielectric heating while being pressed between a mold and a level block, and which is further characterized in the claims. The method of the present invention yields sealed polyolefin resin articles having high mechanical strength and good transparency at the sealed site.

1 Claim, 1 Drawing Sheet

SEALING OF POLYOLEFIN-BASED RESIN AND SEALED ARTICLE OF THE RESIN

BACKGROUND OF THE INVENTION

1. Field of the Invention

The present invention relates to a method of laminating polyolefin-based resin films or sheets by high-frequency (HF) dielectric heating, and to HF-sealed articles of the films or sheets having specific physical properties at the sealed site.

2. Description of the Related Art

In the field of wrapping or packaging materials, stationery, toys, daily necessities and others, generally used are synthetic resin articles as produced from various synthetic resin films and sheets through secondary working of, for example, cutting, laminating and sealing them.

Various methods are employed for secondary working of laminating such shaped synthetic resin materials. The most simple method is of heat-sealing the materials by the use of hot plates and the like. However, this takes a lot of time for sealing and therefore its productivity is low. In addition, since it is difficult to uniformly heat the entire region to be sealed in the method, the outward appearance of the sealed site is often not good. Another method is known of applying ultrasonic vibration to the materials being sealed. However, its effect is not satisfactory in laminating flexible materials such as polyolefin resin materials. Still another method is known of utilizing high-frequency dielectric heating. Its advantages are that molds with a simple structure can be used, with which sealing and cutting can be effected at the same time, and that sealed articles with any desired design can be produced. However, the method is not suitable to polyolefin resin materials having a small dielectric constant and a small dielectric loss coefficient, and is therefore employed exclusively for sealing of polyvinyl chloride resin materials.

Because of the problem of recent environmental pollution with them, polyvinyl chloride resin materials are being kept away from commercial applications. In that situation, the synthetic resin articles in the field in which polyvinyl chloride resin articles have heretofore been used are being gradually replaced with polyolefin resin articles. With that tendency, advantageous sealing by high-frequency dielectric heating is being tried for the production of sealed polyolefin resin articles.

For example, JP-A-55-61435 has proposed a method of high-frequency dielectric heating sealing of polyolefin resin materials, in which a metal conductor element of iron or the like is positioned in places on the resin surfaces to be sealed so that the heat of the metal conductor element as heated by high-frequency voltage applied thereto is transferred to the resin materials. In this method, the metal conductor element of iron powder or the like is contacted with the polyolefin resin materials. Therefore, the method is problematic in that the color and the outward appearance of the sealed articles will be worsened.

JP-A-51-119771 has proposed a high-frequency dielectric heating method for laminating polyolefin resin materials, in which a polar resin sheet is contacted with the polyolefin resin material. JP-A-1-160633 has proposed a technique of contacting a sheet of any of chlorosulfonated polyethylene, chlorinated polyethylene or ethylene-vinyl acetate copolymer with polyolefin resin materials being sealed by high-frequency dielectric heating. JP-A-7-5711 has proposed sealing of copolymer sheets having carbonyl groups as introduced into the polyethylene chain. JP-A-8-52802 has proposed a high-frequency dielectric heating method for sealing, in which the mold and the level block to be used are previously heated at a temperature somewhat lower than the melting point of the materials to be sealed, prior to laminating the materials by high-frequency dielectric heating.

In those methods, polyolefin resin materials could be sealed by high-frequency dielectric heating. However, the sealed articles as obtained according to those methods are problematic in that the mechanical strength of the sealed site of the articles is not satisfactory and that, when materials having high transparency are sealed, the transparency of the sealed site of the sealed articles is lowered. In addition, sparking often occurs in the process of such high-frequency dielectric heating sealing. For these reasons, it is desired to develop a sealing method capable of realizing stable production of sealed articles with no such problems.

SUMMARY OF THE INVENTION

The object of the invention is to provide a high-frequency dielectric heating method for stable sealing of polyolefin resin materials with no sparking, in which the sealed articles produced have extremely high mechanical strength and high transparency at the sealed site, and also to provide the sealed articles as produced in the method.

We, the present inventors have assiduously studied in order to solve the problems noted above, and, as a result, have found that, when a plurality of polyolefin resin films or sheets are sealed in a high-frequency dielectric heating method using a mold for pressing the films or sheets and comprising a combination of specific steps, then the site of the films or sheets to be sealed can be well heated and sealed in the high-frequency field with no sparking occurring therein, and that the sealed articles thus produced in the method have high mechanical strength and good transparency at the sealed site. On the basis of these findings, we have completed the invention.

Specifically, the invention provides the following:

(1) A method for laminating polyolefin resins, which comprises placing a plurality of polyolefin resin films or sheets one upon another and sealing the adjacent surfaces of the films or sheets by high-frequency dielectric heating while being pressed between a mold and a level block, and which is characterized in that (a) the error in the gap between the surface of each pressing edge of the mold and the surface of the level block is controlled within a range of ±100 μm, (b) the mold is heated at a temperature ranging between 30° C. and a temperature lower by 10° C. than the melting point or the thermosoftening point of the films or sheets, while the position-dependent temperature distribution and the time-dependent temperature change at the pressing edges of the mold are kept controlled to fall within a range of a predetermined temperature ±3° C., (c) a pad having a dielectric loss coefficient of at least 0.01 at 23° C. at 1 MHz is positioned on the level block, and the films or sheets are mounted on the pad, and (d) a high-frequency field is applied to the films or sheets being pressed by the mold, in such a manner that no-load current is first applied to the films or sheets at the start of heating them and thereafter the voltage for the current to them is increased up to a level lower than 95% of the dielectric breakdown voltage of the films or sheets thereby to attain the intended sealing of the films or sheets.

(2) A sealed polyolefin resin article of a plurality of polyolefin resin films or sheets with the periphery of the adjacent surfaces of the films or sheets being sealed, wherein the sealed site has a sealing strength of at least 25 N/15 mm width.

(3) A sealed polyolefin resin article of a plurality of polyolefin resin films or sheets with the periphery of the adjacent surfaces of the films or sheets being sealed, wherein the sealed site has a sealing strength of at least 25 N/15 mm width, and has a white light transmittance of at least 50%.

Figure 1:
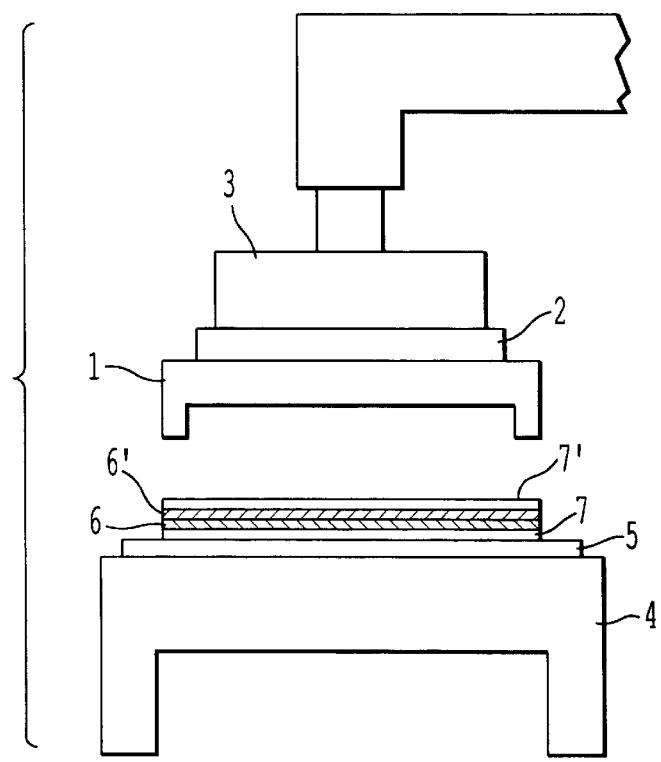
FIG. 1 is a graphic view showing one example of the device to be used in the method of the invention.

In these, 1 is a mold, 2 is a heater, 3 is an upper level block, 4 is a lower level block, 5 is a pad, 6 and 6' are sheets or films to be sealed, 7 and 7' are heat-resistant resin sheets, 8 is a side opening of the file case, 9 and 9' are top and bottom sealed sides, and 10 is another sealed side opposite to the opening.

DETAILED DESCRIPTION OF THE PREFERRED EMBODIMENTS

In the invention, polyolefin resin films or sheets are sealed by sealing. The polyolefin resin includes polyethylene resins, polypropylene resins, and polyolefin resin compositions comprising them.

The polyethylene resins include high-density polyethylene, low-density polyethylene, and linear ethylene-α-olefin copolymers. Of those, especially preferred are linear ethylene-α-olefin copolymers. As the copolymers, preferred are those having long-chain branches, such as ethylene-b 1-hexene copolymers and ethylene-1-octene copolymers. More preferably, the long-chain branches are randomly bonded to the main chain to give the chemical structure of the copolymers. Even more preferably, the linear ethylene-α-olefin copolymers are prepared by copolymerizing ethylene with 1-hexene or the like, for example, in the presence of a so-called metallocene catalyst or geometrically-restrainable metallocene catalyst comprising, as the principal component, a complex with a transition metal such as titanium, zirconium or the like, and have a narrow molecular weight distribution.

As the polypropylene resins, preferred are homopolypropylene, and also copolymers of propylene and ethylene, as well as copolymers of propylene, ethylene and 1-butene. Preferably, the propylene-based copolymers have a comonomer, such as ethylene, content of from 0.1 to 10% by weight relative to propylene. More preferably, the comonomers are randomly bonded to the main chain of the copolymers.

The polyolefin resin compositions comprise different types of polyethylene resins such as those mentioned above, different types of polypropylene resins such as those mentioned above, or a combination of such polyethylene resins and polypropylene resins, and may contain any ordinary fillers and improvers that are generally used for improving the physical properties of the resins. The proportions of those components constituting the compositions may be suitably determined in consideration of the mechanical strength and the design of the end-products of sealed articles.

The films or sheets of those polyolefin resins or their compositions may be prepared in any ordinary molding method. For example, they may be prepared by extrusion molding through a T-die.

The suitable range of the thickness of the polyolefin resin films to be worked according to the sealing method of the invention varies, depending on the type of the resins as well as on the molecular weight, the molecular weight distribution and the chemical structure of the polymer chain of the resins, but may fall generally between 20 and 200 $\mu$m, preferably between 50 and 150 $\mu$m. The thickness of the sheets may fall between 200 and 800 $\mu$m, preferably between 200 and 500 $\mu$m. For thinner films and sheets than those falling within the defined ranges, there will be some risk of their dielectric breakdown increasing. For thicker films and sheets, the mechanical strength of the sealed site will lower and the sealed site could hardly keep the original transparency, thereby resulting in that the outward appearance of the sealed articles is not good. For those reasons, such thinner or thicker films and sheets are unfavorable.

The method of laminating the polyolefin resin films or sheets by high-frequency dielectric heating is described with reference to FIG. 1. FIG. 1 is a graphic view partly showing the mold section of a high-frequency dielectric heating device. In FIG. 1, the numeral reference 1 indicates a mold, which acts also as an upper electrode. The mold 1 is fixed to the upper level block 3 via a heater 2. In FIG. 1, 4 is a lower level block, which acts also as a lower electrode. On the lower level block 4, mounted is a pad 5 which has a dielectric loss coefficient of at least 0.01 at 23° C. at 1 MHz. On the pad 5, a plurality of films or sheets to be sealed, 6, 6' are set with their surfaces to be sealed facing each other. If desired, the films or sheets 6, 6' may be sandwiched between heat-resistant resin sheets 7, 7'. In that manner, the pad 5, the films or sheets to be sealed, 6, 6', and the heat-resistant resin sheets 7, 7' are set in layers between the mold 1 and the lower level block 4, then a high-frequency field is applied between the mold 1 having been heated at a predetermined temperature and the lower level block 4, and the site to be sealed of the films or sheets 6, 6' is pressed against the pressing edges around the periphery of the mold 1, whereby it is sealed. Then, the high-frequency field is cut off. After having been cooled for a while, the mold 1 is opened, and the sealed article is taken out of it. Thus, the sealing process comprising the steps as above is finished.

In carrying out the sealing method of the invention, the error in the gap between the surface of the each pressing edge of the mold 1 and the surface of the lower level block 4 is controlled to fall within a range of ±100 $\mu$m. For controlling the gap error, the degree of mutual inclination between the upper level block 3 and the lower level block 4 is controlled whereby the gap therebetween is unified, and, in addition, the gap error between the mold 1 and the upper level block 3 is controlled to fall within the range of ±100 $\mu$m, for example, by grinding and polishing the facing surfaces of the mold 1 and the upper level block 3. If the gap error oversteps 100 $\mu$m, the thickness distribution in the site of the films or sheets to be sealed will increase, thereby often resulting in local increase in the voltage applied to the site over the dielectric breakdown voltage of the films or sheets being sealed. If so, the risk of sparking will increase.

Before the films or sheets 6, 6' are pressed by it, the mold 1 is heated by the heater 2 to be at a temperature ranging between 30° C. and a temperature lower by 10° C. than the melting point or the thermosoftening point of the films or sheets 6, 6'. If the heating temperature is lower than 30° C., the sealed site of the films or sheets 6, 6' could not have high mechanical strength and good transparency. If, on the other hand, the heating temperature is above the temperature that is lower by 10° C. than the melting point of the thermosoftening point of the films or sheets 6, 6' being sealed, the sealed site will be deformed so that the outward appearance of the end-product, sealed article will be poor. In heating the mold 1, the temperature of the pressing edges is so controlled that its error falls everywhere within a range of a predetermined temperature ±3° C. In addition, the temperature error in the pressing edges shall be so kept as not to overstep the range of a predetermined temperature ±3° C. all the time during the sealing process, without being influenced by the ambient temperature change. The temperature distribution in the pressing edges shall be controlled to fall within the range of ±3° C. all the time throughout the sealing process of heating the films or sheets for sealing them followed by cooling the sealed films or sheets, by controlling the contact between the mold 1 and the heater 2 so that all the pressing edges could uniformly receive and radiate heat. If the temperature distribution in the pressing edges of the mold 1 oversteps the range of ±3° C. somewhere in the edges, the reduction in the films or sheets having been sealed under heat and pressure at the edges will fluctuate, thereby causing a flow of overvoltage passing through the sealed site. In that case, the voltage will be over the dielectric breakdown voltage of the films or sheets to cause sparking. In addition, if the temperature of the pressing edges greatly fluctuates during the sealing process, the temperature fluctuation will bring about a flow of overvoltage passing through the site of the films or sheets being sealed, thereby also causing sparking at the site.

The pad 5 to be used herein may be of a film, sheet or plate of a material having a dielectric loss coefficient of at least 0.01 at 23° C. at 1 MHz. Preferably, the thickness of the pad 5 falls between 0.05 and 5.0 mm, more preferably between 0.1 and 2.0 mm.

The material for the pad 5 includes, for example, organic materials, inorganic materials, and composite materials containing inorganic materials. Concretely, the organic materials include phenolic resins, epoxy resins, polyvinyl formal resins, polychloroprene resins, urea resins, melamine-formaldehyde resins, polycarbonate resins, polymethyl methacrylate resins, aramide resins, polyamide resins, polyamidimide resins, polyvinylidene chloride resins, melamine resins, polysulfone resins, chlorosulfonated polyethylene resins, chlorinated polyethylene resins, etc. The inorganic materials include, for example, spinel ($MgO.Al_2O_3$), mullite, ($3Al_2O_3.SiO_2$), titania ($TiO_2$) and other ceramics. Preferred examples of the composite materials are moldings of inorganic filler-containing phenolic resins, laminates of epoxy resin-infiltrated glass fibers, moldings of carbon fiber-reinforced resins, varnish clothes, etc.

The heat-resistant resin sheets 7, 7', which are optionally used for sandwiching the films or sheets 6, 6' between them, are preferably sheets of polyethylene terephthalate resins, polycarbonate resins, polyethersulfone resins, polyimide resins or the like, and their thickness may fall between 10 and 100 microns. The heat-resistant resin sheets 7, 7' may be placed on either one surface or both surfaces of the films or sheets 6, 6', whereby their smooth surfaces are transferred onto the surfaces of the films or sheets 6, 6' being sealed. As a result, the surface gloss of the sealed site of the films or sheets 6, 6' is increased and the sealed article could have good appearance.

While the pad 5 and the films or sheets 6, 6' are set on the lower level block 4 in layers and the films or sheets 6, 6' are pressed by the pressing edges of the mold 1 in that condition, a high-frequency field is applied to the films or sheets 6, 6' being pressed. The high-frequency field may range between 1 and 300 MHz. For this, in general, preferably employed is an ordinary high-frequency dielectric heating device that may generate high-frequency waves of 27.12 MHz or 40.46 MHz.

The high-frequency field is applied to the films or sheets 6, 6' being sealed, in such a manner that no-load current is first applied to the films or sheets 6, 6' at the start of applying the high-frequency field to them, and thereafter the voltage for the current to them is increased up to a level lower than 95% of the dielectric breakdown voltage of the films or sheets 6, 6' thereby to attain the intended high-frequency dielectric heating of the films or sheets 6, 6'. The high-frequency dielectric heating device to be used for this may be such that the capacitance of the variable capacitor in the matching circuit as connected with the high-frequency power source for it is previously computed as a function to the current to be applied to the device (for example, an automatic tuning device).

In this step, no-load current is first applied to the films or sheets 6, 6' at the start of applying the high-frequency field to them. This is in order to evade the dielectric breakdown of the films or sheets 6, 6' that may be caused by sparking. In the step, when high-frequency power is applied thereto, the films or sheets 6, 6' absorb the power and generate heat, and the high-frequency loss coefficient of the films or sheets 6, 6' has a positive temperature characteristic to increase with their temperature rising. Therefore, if large power is applied to the films or sheets 6, 6' in the initial stage while their temperature is still low, the voltage between the two electrodes between which the films and sheets 6, 6' are put will be too great to evade the risk of sparking.

After the application of the high-frequency power to the films or sheets 6, 6' has been started, the current to them is controlled at a level lower than 95% of the dielectric breakdown voltage of the films or sheets 6, 6' thereby to evade the dielectric breakdown of the films or sheets 6, 6'. The optimum value of the current to be applied to the films or sheets 6, 6' under that condition shall be determined, depending on the type and the thickness of the films or sheets 6, 6' and on their area to be sealed. In general, the current may fall between 0.2 and 5 A, preferably between 0.2 and 2 A. If it is lower than the defined range, the risk of sparking between the electrodes will increase; but if higher, the appearance of the sealed site will be not good.

The time for the high-frequency field application shall also be determined, depending on the type and the thickness of the films or sheets 6, 6' and on their area to be sealed. In general, the time may fall between 0.5 and 10 seconds, preferably between 1 and 6 seconds, more preferably between land 4 seconds. The time for power application for the high-frequency dielectric heating may fall between 0.5 and 10 times, preferably between 1 and 5 seconds, more preferably between 1 and 3 seconds. The cooling time may fall between 0.5 and10 seconds, preferably between 1 and5 seconds, more preferably between 1 and 3 seconds.

Throughout the time for the high-frequency field application and the cooling time, pressure is applied between the mold 1 and the lower level block 4. The pressure shall be determined, depending on the type and the thickness of the films or sheets 6, 6' and on their area to be sealed. Suitably, in general, it may fall between 0.5 and 5 kg/cm$^2$. If the pressure is lower than the defined range, the electrodes will spark; but if higher, the risk of poor appearance of the sealed articles will increase.

In the sealed articles of the invention thus produced in the manner mentioned above, the sealed site has an extremely high sealing strength over a level of 25 N/15 mm width, which could not be realized by any other sealed articles as produced in conventional high-frequency dielectric heating methods. Though varying, depending on the light transmittance of the polyolefin resin films or sheets used, the white light transmittance of the sealed site of the sealed articles of the invention is at least over 50%. Thus, the appearance of the sealed articles of the invention is much superior to that of conventional ones in that, in the former, the transparency of the sealed site could not be differentiated at a glance from that of the non-sealed site.

The sealing strength mentioned above indicates the peeling strength of the sealed site, which is measured as follows: The sealed site of a sealed article to be measured is cut into a test piece having a width of 15 mm, and peeled at 90 degrees at a stress rate of 300 mm/min, using a tensile tester, and the force needed for peeling it is measured. The light transmittance referred to herein is measured, using a haze tester, in accordance with JIS-K-7105. For this, white light is irradiated to a sealed article to be measured, in the direction vertical to the sealed surface of the article, and the amount of light transmittance through the sealed site is measured.

As having such high mechanical strength and good transparency at the sealed site, the sealed articles of the invention have many applications in various fields. For example, they can be used as stationery such as card cases, book cases, files, name holders, etc.; packaging containers for toys, eyedroppers, etc.; daily necessities such as rain things, bags, etc.; as well as other various wrapping or packaging materials.

The invention is described in more detail with reference to the following Examples, which, however, are not intended to restrict the scope of the invention.

EXAMPLE 1

A polyolefin resin composition as prepared by melting and kneading a mixture of 20% by weight of homopolypropylene and 80% by weight of ethylene-1-octene copolymer with a linear molecular structure (1-octene content: 9.5% by weight) was extruded into a sheet [A], which was used herein for sealing. The sheet [A] had a thickness of 200 µm, a length of 330 mm and a width of 240 mm. Two sheets [A] were placed one upon another, and three of the four edges of the piled sheets were sealed to give a file case of FIG. 2.

The high-frequency dielectric heating device of FIG. 1 was used for sealing the sheets [A], in which the mold 1 was fixed to the upper level block 3 via the heater 2, and the lower level block 4 was set below the mold 1. The error in the gas between the upper level block 3 and the lower level block 4 was controlled to be ±30 µm everywhere between them. The surface of the mold 1 at which it is fixed to the upper level block 3 was polished so that the error in the gap between the surface and the pressing edge of the mold 1 was controlled to be ±30 µm.

As the pad 5, a varnish cloth (Empire Cloth (trade name) 0.21 mm thick) having a dielectric loss coefficient of 0.079 at 23° C. at 1 MHz was put on the lower level block 4, and two sheets [A], 6, 6' were put on the pad 5, while being sandwiched between heat-resistant polyethylene terephthalate resin films 7, 7' (thickness: 25 µm each) thereon. The mold 1 had pressing edges (width: 3 mm each) on its pressing surface, facing the periphery of the sheets 6, 6' in two lengthwise directions and in one widthwise direction.

The mold 1 was heated with the heater 2 fixed to the upper level block 3 in the high-frequency dielectric heating device. The temperature of the tip of each pressing edge was controlled to be 98° C. Two hours and 4 hours after the start of heating the mold 1, the temperature distribution in the tip of each pressing edge was measured, and it fell within the range of 98° C. ±2° C. everywhere in the places measured.

The pressure of the mold 1 to the sheets 6, 6' was controlled to be 4.1 kg/cm²G, and kept as it was for 0.5 seconds, and thereafter a high-frequency field of 40.46 MHz was applied to the sheets. The current for the high-frequency dielectric heating was first controlled to be 0.3 A (no-load current) at the start of the heating, and thereafter increased up to 0.55 A over a period of 3 seconds. Then, the current of 0.55 A was kept as such for further 2 seconds. The total time of current application was 5 seconds. After the high-frequency dielectric heating step, the sheets were kept cooled for 2 seconds, and then the mold 1 was opened to remove the pressure therein, and thereafter the sealed article was taken out of the mold 1.

Figure 2:
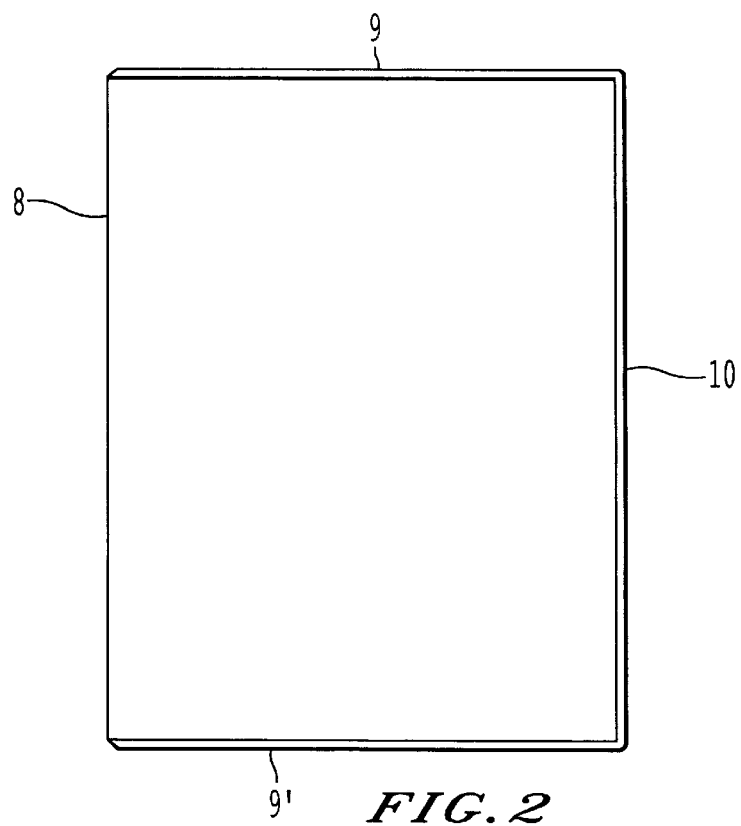
FIG. 2 is a plan view showing a file case as produced according to the method of the invention.

In the manner mentioned above, the file case of FIG. 2 was produced. In FIG. 2, the numeral reference 8 indicates a side opening for papers and others to be therein, 9 and 9' indicate top and bottom sealed sides, and 10 indicates another sealed side opposite to the opening. The width of those sealed sides was 3 mm each. In FIG. 2, shown are the boundaries between the sealed site and the non-sealed site, which, however, are only for the drawing convenience. In fact, in the outward appearance of the file case produced herein, there was found no substantial difference in the transparency between the sealed site and the non-sealed site.

The file case was cut into a test piece of 15 mm width including the sealed site. Using a tensile tester, the sealed site of the test piece was peeled at a stress rate of 300 mm/min at an angle of 90 degrees, and the force needed for peeling it (sealing strength) was measured. Another test piece including the sealed site was cut out. White light was irradiated to it, and the percentage of the light having passed through the sealed site (light transmittance) was measured, using a haze tester, in accordance with JIS-K-7105. The data obtained are shown in Table 1.

EXAMPLE 2

Sheets [A] having the same composition as in Example 1 were used as the sheets to be sealed herein. The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm² and the time for current application was 7.5 seconds. The sealing strength and the light transmittance of the file case were measured. The data obtained are in Table 1.

EXAMPLE 3

A polyolefin resin composition as prepared by melting and kneading a mixture of 20% by weight of ethylene-propylene random copolymer (ethylene content: 4.1% by weight) and 80% by weight of ethylene-1-hexene copolymer (1-hexene content: 2.8% by weight—this was prepared through polymerization in the presence of a metallocene catalyst comprising, as the principal component, a zirconium metal complex) was extruded into a sheet [B], which was used herein for sealing.

The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm², the current applied was 0.5 A and the time for current application was 5.5 seconds. The sealing strength and the light transmittance of the file case were measured. The data obtained are in Table 1.

EXAMPLE 4

Sheets [B] having the same composition as in Example 3 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 3 to produce a file case, except that the pressure of the mold 1 to the sheets was controlled to be 4.1 kg/cm² and the time for current application was 4 seconds. The sealing strength and the light transmittance of the file case were measured. The data obtained are in Table 1.

EXAMPLE 5

A polyolefin resin composition as prepared by melting and kneading a mixture of 40% by weight of ethylene-propylene random copolymer (ethylene content: 2.9% by weight) and 60% by weight of ethylene-1-octene copolymer (1-octene content: 12% by weight—this was prepared through polymerization in the presence of a geometrically-restrainable metallocene catalyst comprising, as the principal component, a titanium metal complex) was extruded into a sheet [C], which was used herein for sealing.

The temperature of the tip of each pressing edges of the mold 1 was controlled to be 100° C. Two hours and 5 hours after the start of heating the mold 1, the temperature distribution in the tip of each pressing edge was measured, and it fell within the range of 100° C.±2° C. everywhere in the places measured. The sheets were sealed in the same manner as in Example 1 to produce a file case, except that the pressure of the mold 1 to the sheets was controlled to be 4.1 kg/cm² and the current applied was 0.5 A. The sealing strength and the light transmittance of the file case were measured. The data obtained are in Table 1.

EXAMPLE 6

Sheets [C] having the same composition as in Example 5 were used as the sheets to be sealed herein. The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 5 to produce a file case, except that the pressure of the mold 1 to the sheets was controlled to be 3.4 kg/cm² and the time for current application was 7.5 seconds. The sealing strength and the light transmittance of the file case were measured. The data obtained are in Table 1.

EXAMPLE 7

A layered sheet [D], in which the interlayer was of linear ethylene-1-octene copolymer (1-octene content: 12% by weight) and this was sandwiched between outer layers of homopolypropylene, was used herein for sealing. In the sheet [D], the thickness of the interlayer was 80 microns, and that of the outer layers was 60 microns each.

The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm², the current applied was 0.5 A and the time for current application was 7.5 seconds. The sealing strength and the light transmittance of the file case were measured. The data obtained are in Table 1.

EXAMPLE 8

Layered sheets [D] having the same composition as in Example 7 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 7 to produce a file case, except that the pressure of the mold 1 to the sheets was controlled to be 4.1 kg/cm² and the time for current application was 4 seconds. The sealing strength and the light transmittance of the file case were measured. The data obtained are in Table 1.

EXAMPLE 9

A layered sheet [E], in which the interlayer was of ethylene-1-hexene copolymer (1-hexene content: 2.8% by weight—the copolymer was prepared through polymerization in the presence of a metallocene catalyst comprising, as the principal component, a zirconium metal complex) and this was sandwiched between outer layers of ethylene-propylene random copolymer (ethylene content: 4.1% by weight), was used herein for sealing. In the sheet [E], the thickness of the interlayer was 180 microns, and that of the outer layers was 60 microns each.

As the pad 5, a Bakelite plate (thickness: 1.0 mm) having a dielectric loss coefficient of 0.25 at 23° C. at 1 MHz was put on the lower level block 4.

The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm², the current applied was 0.35 A and the time for current application was 5.5 seconds. The sealing strength and the light transmittance of the file case were measured. The data obtained are in Table 1.

EXAMPLE 10

Layered sheets [E] having the same composition as in Example 9 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 9 to produce a file case, except that the pressure of the mold 1 to the sheets was controlled to be 4.1 kg/cm² and the time for current application was 4 seconds. The sealing strength and the light transmittance of the file case were measured. The data obtained are in Table 1.

EXAMPLE 11

A layered sheet [E'], which had been prepared through co-extrusion and in which the interlayer was of ethylene-1-octene copolymer (1-octene content: 12% by weight—the copolymer was prepared through polymerization in the presence of a geometrically-restrainable metallocene catalyst comprising, as the principal component, a titanium metal complex) and this was sandwiched between outer layers of ethylene-propylene random copolymer (ethylene content: 2.9% by weight), was used herein for sealing. In the sheet [E'], the thickness of the interlayer was 260 microns, and that of the outer layers was 20 microns each. As the pad 5, the same Bakelite plate as in Example 9 was used.

The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 1 to produce a file case, except that the pressure of the mold 1 to the sheets was controlled to be 3.4 kg/cm$^2$, the current applied was 0.35 A and the time for current application was 5.5 seconds. The sealing strength and the light transmittance of the file case were measured. The data obtained are in Table 1.

EXAMPLE 12

Layered sheets [E'] having the same composition as in Example 11 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 11 to produce a file case, except that the pressure of the mold 1 to the sheets was controlled to be 4.1 kg/cm$^2$ and the time for current application was 4 seconds. The sealing strength and the light transmittance of the file case were measured. The data obtained are in Table 1.

EXAMPLE 13

A layered sheet [F], in which the interlayer was of a composition comprised of 50% by weight of propylene-1-butene random copolymer (1-butene content: 35% by weight) and 50% by weight of homopolypropylene and this was sandwiched between outer layers of homopolypropylene, was used herein for sealing. In the sheet [F], the thickness of the interlayer was 200 microns, and that of the outer layers was 50 microns each. As the pad 5, the same Bakelite plate as in Example 9 was used.

The temperature of the tip of each pressing edges of the mold 1 was controlled to be 110° C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm$^2$, the current applied was 0.35 A and the time for current application was 5.5 seconds. The sealing strength and the light transmittance of the file case were measured. The data obtained are in Table 1.

EXAMPLE 14

Layered sheets [F] having the same composition as in Example 13 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 13 to produce a file case, except that the pressure of the mold 1 to the sheets was controlled to be 4.1 kg/cm$^2$ and the time for current application was 4 seconds. The sealing strength and the light transmittance of the file case were measured. The data obtained are in Table 1.

EXAMPLE 15

A composition comprising a mixture of 70% by weight of polypropylene with low stereospecificity (its stereospecificity was 24.2% relative to the pentad fraction and it has a boiling heptane-insoluble content of 90% by weight) and 30% by weight of hydrogenated styrene-butadiene rubber was molded into a sheet [H], which was used herein for sealing. The thickness of the sheet [H] was 200 microns. As the pad 5, the same Bakelite plate as in Example 9 was used.

The temperature of the tip of each pressing edges of the mold 1 was controlled to be 110°0C. Two hours and 5 hours after the start of heating the mold 1, the temperature distribution in the tip of each pressing edge was measured, and it fell within the range of 110° C.±2° C. everywhere in the places measured. The sheets were sealed in the same manner as in Example 1 to produce a file case, except that the pressure of the mold 1 to the sheets was controlled to be 3.4 kg/cm$^2$, the current applied was 0.35 A and the time for current application was 5.5 seconds. The sealing strength and the light transmittance of the file case were measured. The data obtained are in Table 1.

EXAMPLE 16

Sheets [H] having the same composition as in Example 15 were used as the sheets to be sealed herein. The temperature of the tip of each pressing edges of the mold 1 was controlled to be 120° C. Two hours and 5 hours after the start of heating the mold 1, the temperature distribution in the tip of each pressing edge was measured, and it fell within the range of 120° C.±2° C. everywhere in the places measured. The sheets were sealed in the same manner as in Example 13 to produce a file case, except that the pressure of the mold 1 to the sheets was controlled to be 4.1 kg/cm$^2$ and the time for current application was 4 seconds. The sealing strength and the light transmittance of the file case were measured. The data obtained are in Table 1.

TABLE 1

|  | Sealing Strength (N/15 mm width) | Light Transmittance at Sealed Site (%) |
|---|---|---|
| Example 1 | 30 | 70 |
| Example 2 | 29 | 85 |
| Example 3 | 32 | 85 |
| Example 4 | 26 | 80 |
| Example 5 | 28 | 85 |
| Example 6 | 28 | 75 |

TABLE 1-continued

|  | Sealing Strength (N/15 mm width) | Light Transmittance at Sealed Site (%) |
|---|---|---|
| Example 7 | 29 | 65 |
| Example 8 | 28 | 75 |
| Example 9 | 30 | 70 |
| Example 10 | 30 | 75 |
| Example 11 | 32 | 80 |
| Example 12 | 33 | 90 |
| Example 13 | 30 | 70 |
| Example 14 | 30 | 75 |
| Example 15 | 32 | 80 |
| Example 16 | 33 | 90 |

According to the high-frequency dielectric heating sealing of the invention for polyolefin resin materials, sealed articles are stably produced with no sparking, and the sealed articles produced have extremely high mechanical strength and high transparency at the sealed site.

While the invention has been described in detail and with reference to specific embodiments thereof, it will be apparent to one skilled in the art that various changes and modifications can he made therein without departing from the spirit and scope thereof.

What is claimed is:

1. A method for laminating polyolefin resins, which comprises placing a plurality of polyolefin resin films or sheets one upon another and sealing the adjacent surfaces of the films or sheets by high-frequency dielectric heating while being pressed between a mold and a level block, and which is characterized in that (a) the error in the gap between the surface of each pressing edge of the mold and the surface of the level block is controlled within a range of ±100 μm, (b) the mold is heated at a temperature ranging between 30° C. and a temperature lower by 10° C. than the melting point or the thermosoftening point of the films or sheets, while the position-dependent temperature distribution and the time-dependent temperature change at the pressing edges of the mold are kept controlled to fall within a range of a predetermined temperature ±3° C., (c) a pad having a dielectric loss coefficient of at least 0.01 at 23° C. at 1 MHz is positioned on the level block, and the films or sheets are mounted on the pad, and (d) a high-frequency field is applied to the films or sheets being pressed by the mold, in such a manner that no-load current is first applied to the films or sheets at the start of heating the films or sheets and thereafter the voltage for the current to the films or sheets is increased up to a level lower than 95% of the dielectric breakdown voltage of the films or sheets thereby to attain the intended sealing of the films or sheets.

* * * * *